(12) United States Patent
Lu

(10) Patent No.: US 10,079,682 B2
(45) Date of Patent: Sep. 18, 2018

(54) METHOD FOR MANAGING A TRUSTED IDENTITY

(71) Applicant: Gemalto Inc., Austin, TX (US)

(72) Inventor: HongQian Karen Lu, Austin, TX (US)

(73) Assignee: GEMALTO SA, Meudon (FR)

( * ) Notice: Subject to any disclaimer, the term of this patent is extended or adjusted under 35 U.S.C. 154(b) by 237 days.

(21) Appl. No.: 14/978,568

(22) Filed: Dec. 22, 2015

(65) Prior Publication Data

US 2017/0180128 A1    Jun. 22, 2017

(51) Int. Cl.
*H04L 29/00* (2006.01)
*H04L 9/32* (2006.01)
*H04L 9/08* (2006.01)

(52) U.S. Cl.
CPC ............... *H04L 9/321* (2013.01); *H04L 9/08* (2013.01); *H04L 9/3247* (2013.01); *H04L 9/3271* (2013.01)

(58) Field of Classification Search
CPC ............ G06Q 2220/00; G06Q 20/3829; H04L 63/0442; H04L 63/061; H04L 63/0876; H04L 9/3247; H04L 63/0435; H04L 63/062
See application file for complete search history.

(56) References Cited

U.S. PATENT DOCUMENTS

| 2004/0010696 | A1* | 1/2004 | Cannon ............... G06F 21/10 713/186 |
| 2008/0263357 | A1† | 10/2008 | Boyen |
| 2012/0297185 | A1† | 11/2012 | Camenisch |
| 2015/0269570 | A1* | 9/2015 | Phan ............... G06Q 20/3276 705/71 |
| 2015/0356555 | A1* | 12/2015 | Pennanen ............ G06Q 20/06 705/71 |
| 2017/0005804 | A1† | 1/2017 | Zinder |

OTHER PUBLICATIONS

Nakamoto S. "Bitcoin: A Peer-to-Peer Electronic Cash System" Oct. 31, 2008, XP055131503. (10 pages).
Menezes A. J. et al. Handbook of Applied Cryptography, Chapter 13, "Key Management Techniques" CRC Press, Inc., pp. 543-590, Oct. 1, 1996. XP001525013.
Menezes A. J. et al. Handbook of Applied Cryptography, Chapter 10, "Key Management Techniques" CRC Press, Inc., pp. 385-424, Oct. 1, 1996. XP001525010.

(Continued)

*Primary Examiner* — Ghazal Shehni
(74) *Attorney, Agent, or Firm* — Buchanan Ingersoll & Rooney PC

(57) ABSTRACT

The invention is a method for deploying a trusted identity for a user issued by an issuer. The user has a user device configured to send a request for signature to an issuer device handled by the issuer. The request comprises a user public key allocated to the user. The issuer device is configured to compute an issuer signature by signing both the user's trusted identity and the user public key using an issuer private key allocated to the issuer. A block chain transaction containing the issuer signature is created and submitted to a Block Chain for transaction verification and storage.

11 Claims, 4 Drawing Sheets

(56) References Cited

OTHER PUBLICATIONS

Menezes A. J. et al. Handbook of Applied Cryptography, Chapter 12, "Key Management Techniques" CRC Press, Inc., pp. 489-541, Oct. 1, 1996. XP001525012.
International Search Report and Written Opinion (Forms PCT/ISA/210 and PCT/ISA/237) dated Mar. 9, 2017, by the International Searching Authority in corresponding International Application No. PCT/EP2016/081911. (13 pages).

* cited by examiner
† cited by third party

METHOD FOR MANAGING A TRUSTED IDENTITY

FIELD OF THE INVENTION

The present invention relates to methods of managing a trusted identity for a user. It relates particularly to methods of deploying user's trusted identity and to methods of authenticating user's trusted identity.

BACKGROUND OF THE INVENTION

Centrally issued and trusted identities are widely used for employment, tax, mortgage, health care or social security benefits for example. A trusted identity is an identity whose content can be authenticated. However, identity theft and identity fraud are major problems. Each year fraudsters stole billions of dollars from millions of consumers. Such a fraud is possible because there is no easy way to verify the true owner of a trusted identity. In other words, a thief can use a stolen trusted identity since only the validity—as such—of the trusted identity is controlled.

Therefore, there is a need to develop new methods and devices allowing to prevent several people from claiming a same trusted identity.

SUMMARY OF THE INVENTION

An object of the invention is to solve the above mentioned technical problem.

An object of the present invention is a method for deploying a trusted identity for a user issued by an issuer. The user has a user device configured to send a request for signature to an issuer device handled by the issuer. The request comprises a user public key allocated to the user. The issuer device is configured to compute an issuer signature by signing both the user's trusted identity and the user public key using an issuer private key allocated to the issuer. A block chain transaction containing the issuer signature is created and submitted to a Block Chain for transaction verification and storage.

Advantageously, the issuer device may send the issuer signature in response to the request and the block chain transaction may be created by the user device and may contain the user's trusted identity.

Advantageously, the user device may generate an encrypted identity by encrypting the user's trusted identity with a secret key generated in the user device. The user device may generate an encrypted key by encrypting the secret key using a key encryption key. The block chain transaction created by the user device may contain the encrypted key and the encrypted identity.

Advantageously, the key encryption key may be a public key belonging to a key pair generated by the user device.

Advantageously, the request may comprise a block chain address. The issuer device may generate an encrypted identity by encrypting the trusted identity with a secret key generated in the issuer device. The issuer device may generate an encrypted key by encrypting the secret key using the user public key. The issuer device may create a block chain transaction containing a digital asset including both the issuer signature, the encrypted identity and the encrypted key and may submit the block chain transaction to the Block Chain for transaction verification and storage to the block chain address.

Advantageously, the request may comprise a block chain address. The issuer device may compute a hash of the trusted identity and send the trusted identity to the user device. The issuer device may create the block chain transaction containing the hash and submit the block chain transaction to the block chain for transaction verification and storage to the block chain address. The user device may receive the block chain transaction from the block chain.

Another object of the present invention is a method for authenticating a user trusted identity by a verifier device. The user trusted identity is being issued by an issuer. The user has a user device which sends a message to the verifier device. The message comprises a transaction identifier and a user public key allocated to the user. The verifier device retrieves a block chain transaction comprising an issuer signature from a block chain using the transaction identifier and verifies the transaction. In case of successful verification, the verifier device sends a challenge to the user device which computes a response by signing the challenge using the user's private key and sends the response to the verifier device. The verifier device checks the user signature using the user public key and, in case of successful checking, the verifier device verifies the issuer signature using the user trusted identity, the user public key and the issuer public key.

Advantageously, the verifier device may retrieve the user trusted identity from a block chain transaction or may receive the user trusted identity from the user device.

Advantageously, the block chain transaction may contain an encrypted key and an encrypted identity. In case of successful checking of the user signature, the verifier device may send the encrypted key and a verifier public key to the user device. The user device may derive a key encryption key and retrieve a secret key by decrypting the encrypted key using the key encryption key. Then the user device may encrypt the secret key using the verifier public key and send the resulting new encrypted key to the verifier device. The verifier device may retrieve the secret key by decrypting the new encrypted key using a verifier private key, then the verifier device may retrieve the user trusted identity by decrypting the encrypted identity using the secret key.

Another object of the present invention is a user device configured to receive a user trusted identity generated by an issuer device and to send a request for signature to the issuer device. The request comprises a user public key allocated to a user of the user device. The user device is configured to receive, in response to the request, an issuer signature generated by signing both the user trusted identity and the user public key using an issuer private key allocated to the issuer. The user device is configured to create a block chain transaction containing the issuer signature and to submit said block chain transaction to a Block Chain for verification and storage.

Advantageously, the user device may be configured to generate an encrypted identity by encrypting the user's trusted identity with a secret key generated in the user device. The user device may be configured to generate an encrypted key by encrypting the secret key using a key encryption key. The user device may be configured to include the encrypted key and the encrypted identity in the block chain transaction.

Advantageously, the user device may be configured to send a message to a verifier device, said message comprising a transaction identifier and a user public key allocated to the user. The user device may be configured to compute a response by signing a challenge received from the verifier device using the user's private key and to send the response to the verifier device.

Another object of the present invention is an issuer device configured to send a trusted identity for a user. The trusted identity is issued by an issuer. The issuer device is configured to receive a request for signature from a user device, said request comprising both a block chain address and a user public key allocated to the user of the user device. The issuer device is configured to compute an issuer signature by signing both the user's trusted identity and the user public key using an issuer private key allocated to the issuer. The issuer device is configured to generate an encrypted identity by encrypting the trusted identity with a secret key generated in the issuer device. The issuer device is configured to generate an encrypted key by encrypting the secret key using the user public key. The issuer device is configured to create a block chain transaction containing a digital asset including the issuer signature, the encrypted identity and the encrypted key and to submit the block chain transaction to a Block Chain for transaction verification and storage to the block chain address.

Another object of the present invention is an issuer device configured to send a trusted identity for a user issued by an issuer. The issuer device is configured to receive a request for signature from a user device, said request comprising both a block chain address and a user public key allocated to the user of the user device. The issuer device is configured to compute an issuer signature by signing both the user's trusted identity and the user public key using an issuer private key allocated to the issuer. The issuer device is configured to generate a hash of the trusted identity. The issuer device is configured to send the trusted identity to the user device. The issuer device is configured to create a block chain transaction containing the hash and to submit the block chain transaction to a Block Chain for transaction verification and storage to the block chain address.

Another object of the present invention is a verifier device configured to authenticate a user trusted identity of a user issued by an issuer having a public key. The verifier device is configured to receive a message from a user device of the user, said message comprising a transaction identifier and a user public key allocated to the user. The verifier device is configured to retrieve a block chain transaction comprising an issuer signature from a block chain using the transaction identifier and to verify the transaction. In case of successful verification, the verifier device is configured to send a challenge to the user device, to get a response computed by the user device and to checks the response using the user public key. In case of successful checking, the verifier device is configured to verify the issuer signature using the user trusted identity, the user public key and the issuer public key.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

Figure 1:
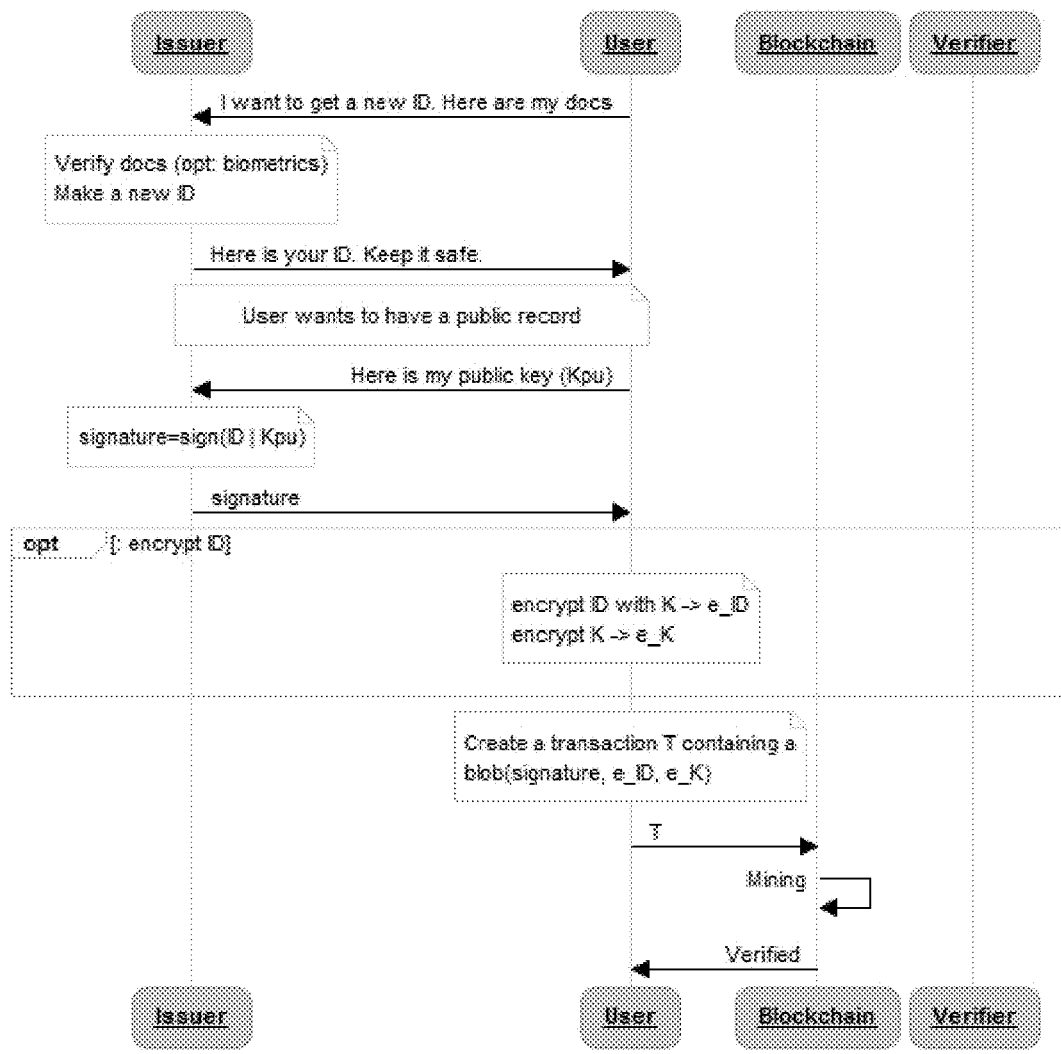
FIG. 1 depicts a flowchart showing a first example of identity issuance sequence according to the invention.

The invention may apply to any type of digital identity issued by an issuance authority (also called issuer) and intended to be allocated to a user.

The invention relies on public/private key pair and cryptographic functions as commonly used in the so-called public-key cryptography domain.

The user is supposed to have a device (called user device) which is used for the trusted identity deployment and for the trusted identity checking. The user device may be a passport, a driving license, a smart phone, a tablet PC, an electronic pair of glasses, an electronic watch, an electronic bracelet, an electronic wearable device, a portable gaming machine or a computer for example.

Identity issuer is the entity who issues the trusted identity, e.g. driver license, social security number, passport, health care ID, etc. Thus the trusted identity can be an identity document issued by an issuer and may contain an identifier, various information, or user attributes. The trusted identity can also be one or more vetted attributes associated with a user. In this case, the issuer vouches for the attributes.

The user is assumed to request for a trusted identity (or vouch of attributes) and to use the trusted identity when needed. The user can be a person, a machine, or an Internet of Thing (IoT).

The verifier is an entity who needs the user to prove the ownership and legitimacy of the trusted identity. For example, a verifier can be a service provider, e.g. a bank, or a peer to the user, e.g. another IoT. The user is assumed to want a service from the service provider, e.g. apply for a mortgage. The service provider wants trusted identity from the user and needs to know that the user is indeed the owner of the trusted identity. The user needs to prove it. The verifier is assumed to know and trust the issuer.

A block chain (also named blockchain) is a distributed ledger which maintains a continuously growing list of transactional data records assumed to be resistant against tampering and revision. Generally a block chain relies on a timestamp server which, after batching recent transactions into blocks, takes a hash of a block to be time stamped and widely publishes the hash. The hash allows to prove that the data must have existed at the time. The hash of each block includes the hash of prior block. Thus a chain of blocks is created where each block linked to its predecessor. Thus a transaction recorded in a block can be get from a block chain and it is possible to check that this recorded transaction has not been altered. A block chain can be considered an incontestable record keeper. Additionally, a block chain can provide integrity protection and pseudo-anonymity. One of the most widely known application of the block chain technology is the public ledger of transactions for the crypto currency bitcoin which aims at storing financial transactions.

For the sake of brevity, in the present specification, the word "user" is sometime used instead of "user device". Similarly "issuer" is sometime used instead of "issuer device" and "verifier" instead of "verifier device".

FIG. 1 illustrates a first example of sequence for an identity issuance according to the invention. In this example, the issuer is assumed to manage an issuer device which may be an identity server able to generate trusted identities and the user is a person assumed to manage a user device which may be a laptop.

The user device is able to communicate with the identity server (issuer device) through any kind of network. For instance, the communication may be set through a combination of a wireless channel (like Wi-Fi® or Bluetooth®) and a wired channel (like Ethernet).

First, the user (or user device) asks the identity issuer (or issuer device) for a trusted identity ID. The user provides necessary documents (e.g. birth certificate and optionally biometrics) that prove his/her identity.

Then the issuer verifies the documents. If all is good, the issuer creates a new trusted identity ID and sent it to the user for safe keeping.

According to the invention, the user chooses to have a public record (i.e. a record in a public ledger): the user sends a request for signature to the issuer. This request contains the public key Kpu of the user.

Then the issuer digitally signs the couple trusted identity and user public key (ID|Kpu) and gives the resulting signature (i.e. issuer signature) to the user.

At this point, the user may directly create a block chain transaction containing the issuer signature.

Alternatively, the user may use a secret key K to encrypt the trusted identity ID, to generate an encrypted trusted identity (e_ID). Then the user may get an key encryption key (i.e. KEK). For instance, it may derives a key (or key pair) KEK from a public/private key pair. The derivation parameter can be handled in a number of ways. Then the user encrypts the secret key K using the key encryption key KEK (public key if it is a key pair), resulting encrypted key e_K. At this stage, the user creates a block chain transaction T containing a blob including the issuer signature, the encrypted trusted identity e_ID, and the encrypted secret key e_K.

In both cases, the user submits the transaction to a block chain. Once the transaction T is verified (by the entity managing the block chain), the transaction T is recorded in the Block Chain.

In one embodiment, the invention may be implemented by using the format of Bitcoin transaction if the block chain is a Bitcoin block chain. In this case, multiple output addresses are made of the data blob. Another output address can be the user's address. New transaction formats may also be defined for easy recording of digital assets.

Figure 2:
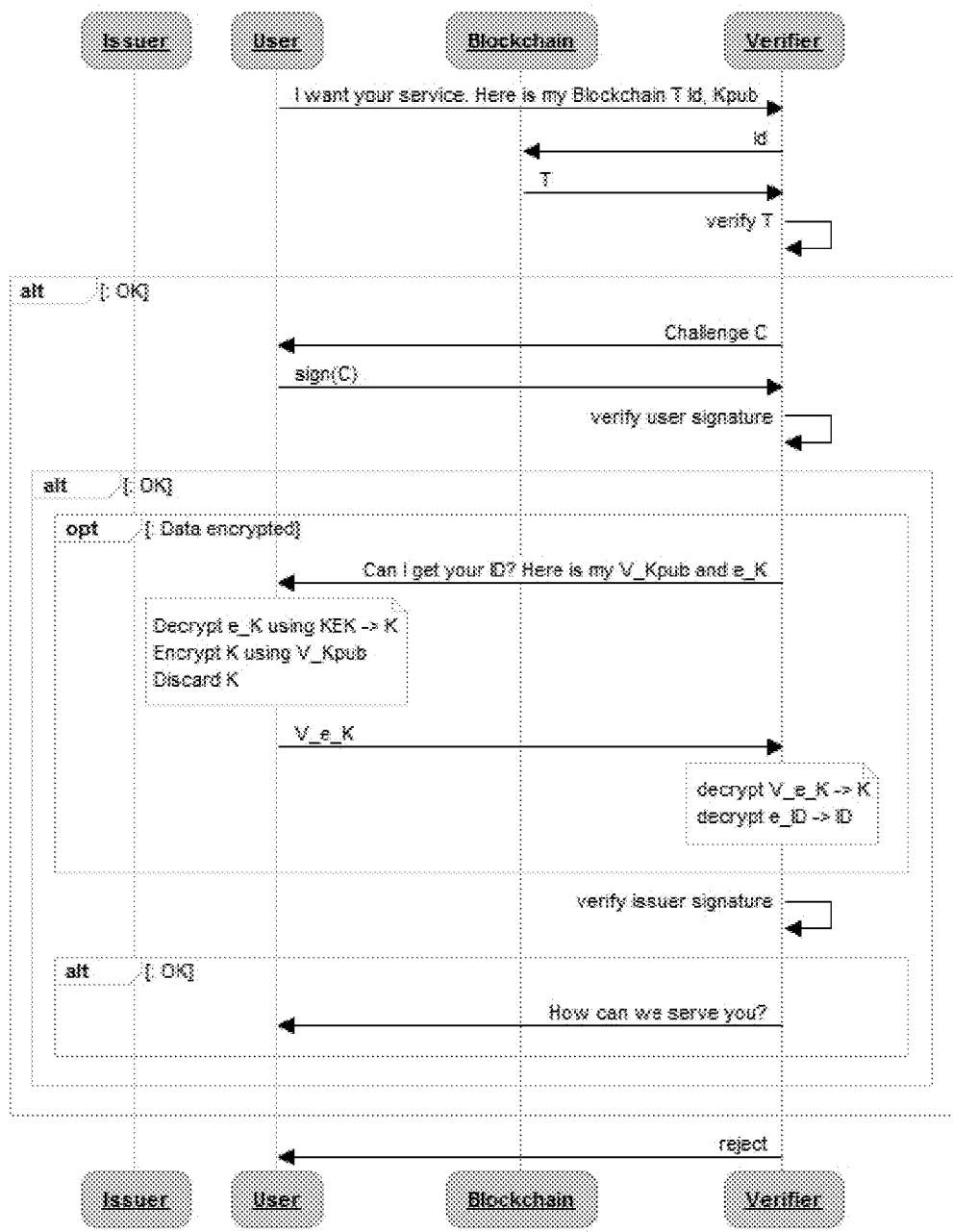
FIG. 2 depicts a flowchart showing an example of identity proofing sequence according to the invention.

FIG. 2 illustrates an example of identity proofing sequence according to the invention.

In this example, a block chain transaction is assumed to have been created and recorded according to the invention.

The verifier is assumed to manage a verifier device which is able to access the block chain and interact with the user device. The verifier device may be a server connected to the Internet for instance.

In this example, the user wants to use some service provided by the verifier or wants to interact with the verifier in general. The verifier needs user's identity ID. It wants verify that the trusted identity ID is indeed issued by an issuing authority and wants the user to prove that the trusted identity ID is indeed issued to him/her.

First, the user (or user device) tells the verifier his block chain transaction identifier Id (or an identifier that can identify the user's transaction or record), and a reference allowing to identify the issuer of the trusted identity ID. Additionally, the user may also provide the verifier with its public key Kpu.

Using the transaction identifier Id, the verifier finds the transaction T from the block chain and verifies the transaction T. In other words, the verifier check the genuineness and integrity of the recorded transaction. If the transaction T is successfully checked, the verifier continues as follows.

The verifier verifies the user, indeed the owner of this transaction, by sending a challenge C. In response, the user signs the challenge C using his private key Kpr and sends back the result to the verifier. The verifier verifies the received user's signature. In case of successful verification, the verifier continues as follows.

If the data is encrypted, the verifier sends the encrypted key e_K (found in the transaction) and its own public key V_Kpub to the user.

Then the user re-encrypts the secret key K with the verifier's public key V_Kpub resulting a new encrypted key V_e_K and sends it to the verifier. For instance, the user decrypts the encrypted key e_K using the key KEK and retrieves the secret K, and then re-encrypts the secret key K with the verifier's public key V_Kpub. In this case, the user can then delete the secret key K.

Then the verifier decrypts the new encrypted key V_e_K with its private key and retrieves the secret key. The verifier can now decrypts the encrypted identity e_ID using the secret key K and retrieves the trusted identity ID.

The verifier verifies the Issuer's signature using User's ID, the user's public key Kpu and the issuer's public key. If the verification succeeds, the verifier can provide service to the user.

By the end, the verifier has verified that the issuer has indeed issued the trusted identity ID to the user who has the private key corresponding to the user's public key.

Thanks to the invention, the verifier can check the user's trusted identity without contacting the original issuer.

Alternatively, the user may keep the trusted identity ID instead of putting it in the block chain transaction. In this case, the user presents the trusted identity ID to the verifier and the verifier checks the block chain record to verify that the trusted identity ID belongs to the user.

In one example, the user's key pair is the same as the key pair associated with the block chain address.

In another example, the user's key pair is different from that associated with the block chain address.

Figure 3:
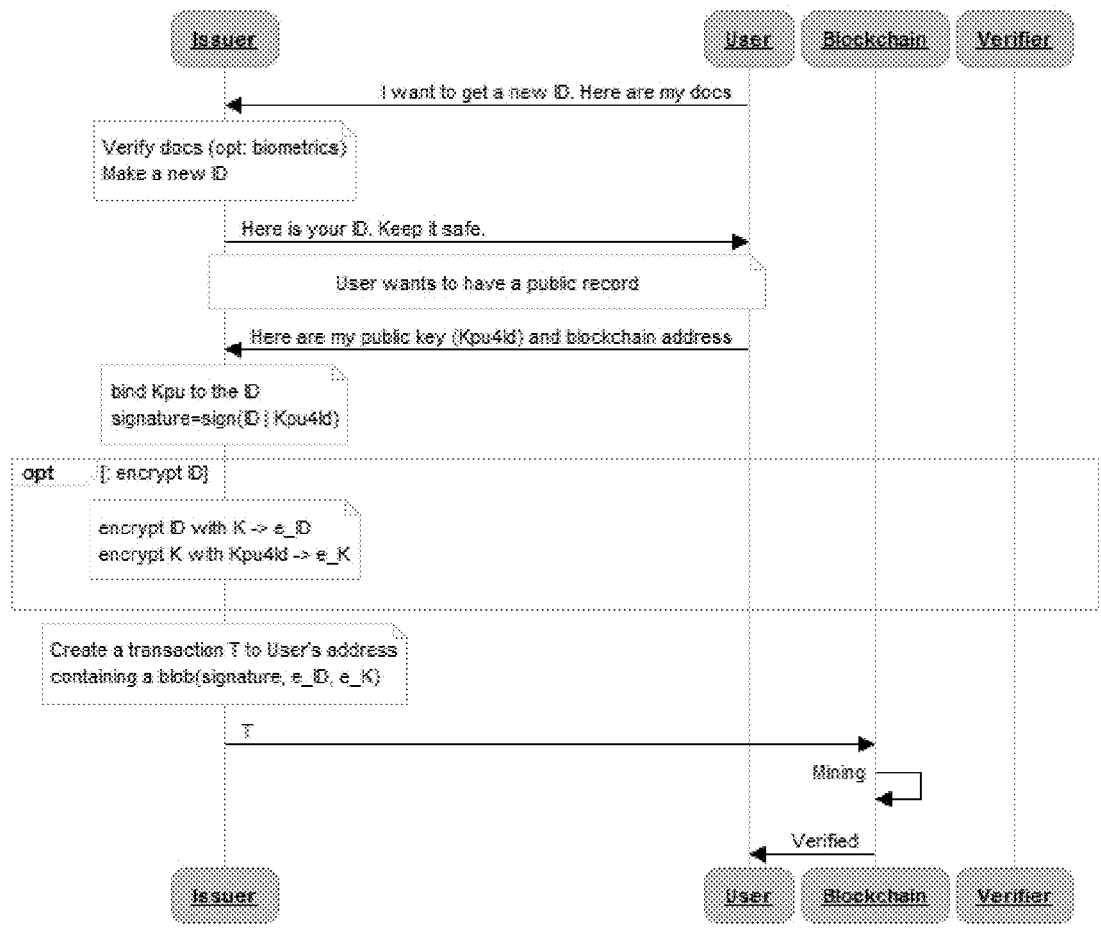
FIG. 3 depicts a flowchart showing a second example of identity issuance sequence according to the invention.

FIG. 3 illustrates a second example of sequence for an identity issuance according to the invention.

The first steps are similar to those described at FIG. 1.

The user chooses to have a public record: the user device sends a request for signature to the issuer device. This request contains both the public key (Kpu4Id) of the user and a block chain address.

Then the issuer digitally signs the couple trusted identity and received user public key (ID|Kpu4Id) to generate an issuer signature.

The issuer device generates an encrypted identity e_ID by encrypting the trusted identity ID with a secret key K generated in the issuer device. The issuer device also generates an encrypted key e_K by encrypting the secret key K using the received user public key (Kpu4Id).

Then the issuer device creates a block chain transaction T containing a digital asset including the generated issuer signature, the encrypted identity e_ID and the encrypted key e_K. The issuer device submits the block chain transaction T to the Block Chain for transaction verification and storage to the block chain address provided by the user.

Instead of fully encrypting the trusted identity ID, the trusted identity ID may also be partially encrypted. For example, the identifier may be in clear while the attributes are encrypted.

In another embodiment (not shown), the ID issuer gives an (digital) identity document to the user, computes a cryptographic hash of the trusted identity ID, and transfers the computed hash of the ID to the user through the block chain as a digital asset.

For example, on receipt of the request comprising both the user's public key and a block chain address, the issuer device computes a hash of the trusted identity ID. The issuer device sends the trusted identity ID to the user device and creates a block chain transaction T containing the hash. Then the issuer device submits this block chain transaction T to the block chain for transaction verification and storage to the block chain address of the user. Then the user device can receive the block chain transaction T from the block chain.

The block chain in this invention can be a public block chain used for more than one purposes, or a private block chain serving identity and associated purposes. It is to be noted that one or more identity issuers may use the same block chain.

Figure 4:
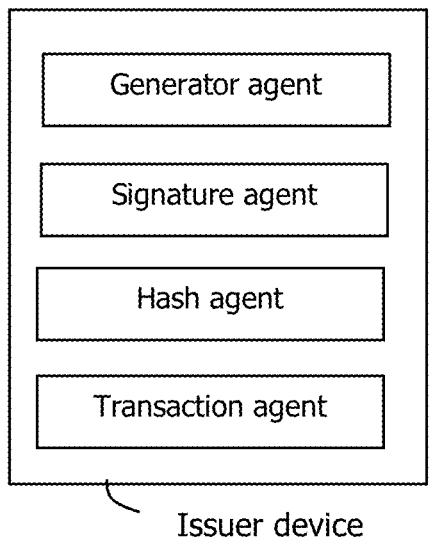
FIG. 4 shows an example of an issuer device according to the invention.

FIG. 4 illustrates schematically an example of an issuer device according to the invention.

The issuer device may be a server comprising a generator agent configured to generate a trusted identity for a user. The issuer device comprises a signature agent configured to receive a request for signature comprising both a block chain address and a public key allocated to the user. The signature agent is configured to compute an issuer signature by signing both the user's trusted identity and the user's public key using an issuer private key allocated to the issuer. The issuer device comprises a hash agent configured to compute a hash of the trusted identity. For instance, the hash agent may implement the SHA-2 algorithms (Secure Hash Algorithms defined by the National Security Agency). The issuer device comprises a transaction agent configured to create a block chain transaction T containing a digital asset which includes the issuer signature and the hash. The transaction agent is configured to submit this block chain transaction to a Block Chain for transaction verification and storage to the block chain address of the user.

In another example (not shown), the issuer device may comprise a generator agent and a signature agent as described above. In addition, the issuer device may comprise a key generator adapted to generate a secret key and a ciphering agent configured to generate an encrypted identity by encrypting the trusted identity with the generated secret key. The issuer device comprises a transaction agent configured to create a block chain transaction containing a digital asset including the issuer signature, the encrypted identity and the encrypted key. The transaction agent is also configured to submit the block chain transaction to a Block Chain for transaction verification and storage to the block chain address.

Figure 5:
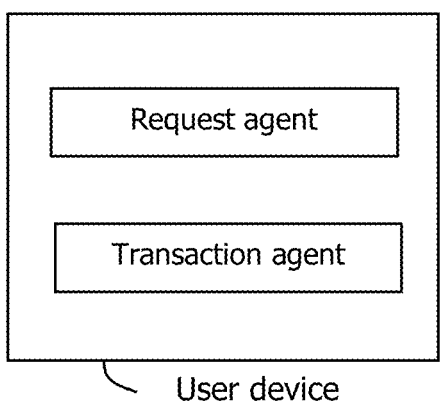
FIG. 5 shows an example of a user device according to the invention.

FIG. 5 illustrates schematically an example of a user device according to the invention.

The user device may be a smartphone comprising a request agent configured to build a request for signature comprising the public key of the user of the user device and to send the request to an issuer device. The user device comprises a transaction agent configured to receive, in response to the request, an issuer signature generated by signing both the user trusted identity and the user public key using a private key allocated to the issuer. The transaction agent is also configured to create a block chain transaction containing the issuer signature and to submit this block chain transaction to a Block Chain for verification and storage.

In another example (not shown), the user device may comprise a request agent similar to the one described above and a ciphering agent configured to generate a secret key and to generate an encrypted identity by encrypting the received user's trusted identity with the generated secret key. The ciphering agent is also configured to generate an encrypted key e_K by encrypting the secret key K using a key encryption key. The ciphering agent is configured to identify the key encryption key to be used. For instance, it can derive the KEK from a secret key, which it keeps.

Preferably, the user device may comprise a sender agent (not shown) configured to send a message to a verifier device, the message comprising a transaction identifier Id and a user public key Kpu allocated to the user. The user device may also comprise a crypto agent configured to compute a response by signing a challenge C received from a verifier device using the user's private key Kpr and to send the response to the verifier device.

Figure 6:
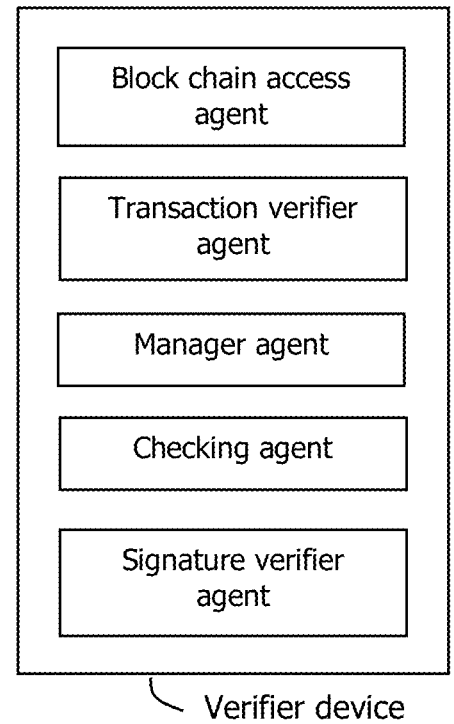
FIG. 6 shows an example of a verifier device according to the invention.

FIG. 6 illustrates schematically an example of a verifier device according to the invention.

The verifier device may be a server comprising a block chain access agent configured to receive from a user device a message comprising a transaction identifier Id and a user public key Kpu allocated to the user of the user device, and to retrieve a block chain transaction (comprising an issuer signature) from a block chain using the transaction identifier Id.

The verifier device comprises a Transaction verifier agent configured to verify (genuineness/integrity) the retrieved block chain transaction.

The verifier device comprises a Manager agent configured to, in case of successful transaction verification, send a challenge C to the user device and to get a response computed by the user device.

The verifier device comprises a Checking agent configured to check the response using the user public key (Kpu).

The verifier device comprises a Signature verifier agent configured to, in case of successful response checking, verify the issuer signature using the user trusted identity, the user public key and the issuer public key.

Alternatively, the verifier device may be configured to retrieve a hash from a block chain transaction and to verify if this hash is compatible with the trusted identity.

Optionally, the verifier device may be configured to receive the trusted identity directly from the user device.

The agents of the issuer device, user device and verifier device may be implemented as software components. Preferably, some cryptographic features may be performed by hardware components.

Thanks to the invention, only the trust owner can prove the ownership of the trusted identity. A theft cannot prove the ownership because he does not have the private key.

The verifier can verify the owner and trustworthiness of a trusted identity or attributes.

It must be understood, within the scope of the invention that the above-described embodiments are provided as non-limitative examples. Features of the described examples may be partly and fully combined.

The invention claimed is:

1. A method for deploying a trusted identity of a user issued by an issuer,
   wherein the user has a user device configured to send a request for signature to an issuer device handled by the issuer, said request comprising a user public key allocated to the user,
   wherein, in response to receiving the request for signature, the issuer device is configured to compute an issuer signature by signing both the user's trusted identity and the user public key using an issuer private key allocated to the issuer, and wherein a block chain transaction containing the issuer signature is created and submitted to a Block Chain for transaction verification and storage.

2. The method according to claim 1, wherein said issuer device sends the issuer signature in response to the request and wherein the block chain transaction is created by the user device and contains the user's trusted identity.

3. The method according to claim 2, wherein the user device generates an encrypted identity by encrypting the user's trusted identity with a secret key generated in the user device,
wherein the user device generates an encrypted key by encrypting the secret key using a key encryption key, and
wherein the block chain transaction created by the user device contains the encrypted key and the encrypted identity.

4. The method according to claim 3, wherein the key encryption key is a public key belonging to a key pair generated by the user device.

5. The method according to claim 1, wherein said request comprises a block chain address, wherein the issuer device generates an encrypted identity by encrypting the trusted identity with a secret key generated in the issuer device,
wherein the issuer device generates an encrypted key by encrypting the secret key using the user public key, and
wherein the issuer device creates a block chain transaction containing a digital asset including both the issuer signature, the encrypted identity and the encrypted key and submits the block chain transaction to the Block Chain for transaction verification and storage to the block chain address.

6. The method according to claim 1, wherein said request comprises a block chain address, wherein the issuer device computes a hash of the trusted identity and sends the trusted identity to the user device,
wherein the issuer device creates the block chain transaction containing the hash and submits said block chain transaction to the block chain for transaction verification and storage to the block chain address, and
wherein the user device receives the block chain transaction from the block chain.

7. A user device comprising a processing device and a memory, wherein the user device, via the processing device and the memory, is configured to receive a user trusted identity generated by an issuer device and to send a request for signature to the issuer device, said request comprising a user public key allocated to a user of the user device,
wherein the user device is configured to receive, in response to the request, an issuer signature generated by signing both the user trusted identity and the user public key using an issuer private key allocated to the issuer and
wherein the user device is configured to create a block chain transaction containing the issuer signature and to submit said block chain transaction to a Block Chain for verification and storage.

8. The user device according to claim 7, wherein the user device is configured to generate an encrypted identity by encrypting the user's trusted identity with a secret key generated in the user device, wherein the user device is configured to generate an encrypted key by encrypting the secret key using a key encryption key, and
wherein the user device is configured to include the encrypted key and the encrypted identity in the block chain transaction.

9. The user device according to claim 7, wherein the user device is configured to send a message to a verifier device, said message comprising a transaction identifier and a user public key allocated to the user, and
wherein the user device is configured to compute a response by signing a challenge received from the verifier device using the user's private key and to send the response to the verifier device.

10. An issuer device comprising a processing device and a memory, wherein the issuer device, via the processing device and the memory, is configured to send a trusted identity for a user issued by an issuer,
Wherein the issuer device is configured to receive a request for signature from a user device, said request comprising both a block chain address and a user public key allocated to the user of the user device,
wherein, in response to receiving the request for signature, the issuer device is configured to compute an issuer signature by signing both the user's trusted identity and the user public key using an issuer private key allocated to the issuer,
wherein the issuer device is configured to generate an encrypted identity by encrypting the trusted identity with a secret key generated in the issuer device,
wherein the issuer device is configured to generate an encrypted key by encrypting the secret key using the user public key, and
wherein the issuer device is configured to create a block chain transaction containing a digital asset including both the issuer signature, the encrypted identity and the encrypted key and to submit the block chain transaction to a Block Chain for transaction verification and storage to the block chain address.

11. An issuer device comprising a processing device and a memory, wherein the issuer device, via the processing device and the memory, is configured to send a trusted identity for a user issued by an issuer,
wherein the issuer device is configured to receive a request for signature from a user device, said request comprising both a block chain address and a user public key allocated to the user of the user device,
wherein, in response to receiving the request for signature, the issuer device is configured to compute an issuer signature by signing both the user's trusted identity and the user public key using an issuer private key allocated to the issuer,
wherein the issuer device is configured to generate a hash of the trusted identity,
wherein the issuer device is configured to send the trusted identity to the user device, and
wherein the issuer device is configured to create a block chain transaction containing the hash and to submit the block chain transaction to a Block Chain for transaction verification and storage to the block chain address.

* * * * *